(12) United States Patent
Smith

(10) Patent No.: US 10,931,685 B2
(45) Date of Patent: Feb. 23, 2021

(54) MALWARE ANALYSIS AND RECOVERY

(71) Applicant: UT Battelle, LLC, Oak Ridge, TN (US)

(72) Inventor: Jared M. Smith, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 215 days.

(21) Appl. No.: 15/837,942

(22) Filed: Dec. 11, 2017

(65) Prior Publication Data
US 2018/0167403 A1 Jun. 14, 2018

Related U.S. Application Data

(60) Provisional application No. 62/432,929, filed on Dec. 12, 2016.

(51) Int. Cl.
| | |
|---|---|
| *H04L 29/06* | (2006.01) |
| *G06F 21/55* | (2013.01) |
| *G06F 21/56* | (2013.01) |
| *G06F 11/30* | (2006.01) |
| *G06N 20/00* | (2019.01) |

(52) U.S. Cl.
CPC .......... *H04L 63/1416* (2013.01); *G06F 21/55* (2013.01); *G06F 21/56* (2013.01); *H04L 63/145* (2013.01); *H04L 63/1408* (2013.01); *H04L 63/1425* (2013.01); *G06N 20/00* (2019.01)

(58) Field of Classification Search
CPC . G06N 20/00; H04L 63/1408; H04L 63/1416; H04L 63/1425; H04L 63/145; G06F 21/55; G06F 21/56
See application file for complete search history.

(56) References Cited

U.S. PATENT DOCUMENTS

| | | | |
|---|---|---|---|
| 7,624,443 B2 | 11/2009 | Kramer et al. | |
| 7,784,098 B1 * | 8/2010 | Fan | G06F 11/1471 |
| | | | 726/24 |
| 7,934,262 B1 * | 4/2011 | Natanzon | G06F 21/564 |
| | | | 707/648 |

(Continued)

OTHER PUBLICATIONS

Hsu, Francis, et al. "Back to the future: A framework for automatic malware removal and system repair." 2006 22nd Annual Computer Security Applications Conference (ACSAC'06). IEEE, 2006. (Year: 2006).*

(Continued)

*Primary Examiner* — Michael Simitoski
(74) *Attorney, Agent, or Firm* — Lempia Summerfield Katz LLC

(57) ABSTRACT

A system and method detects malware by processing notifications from an intrusion detection system and baseline snapshots from an image capture utility. The image capture utility constructs an image of the suspected malware intrusion and links the suspected malware intrusion to the baseline snapshots. The system and method propagates the image of the suspected malware intrusion across multiple networks before it distinguishes malicious code, device state, and files from benign code, device state, and files. Some systems and methods include a malware recovery system that executes machine learning instructions and heuristics to revert a client and/or a remote server to one or more baseline snapshots.

17 Claims, 3 Drawing Sheets

(56) References Cited

U.S. PATENT DOCUMENTS

| | | | | |
|---|---|---|---|---|
| 7,962,956 | B1* | 6/2011 | Liao | G06F 21/568 726/13 |
| 8,904,531 | B1* | 12/2014 | Saklikar | G06F 21/552 707/695 |
| 8,914,882 | B2 | 12/2014 | McDougal et al. | |
| 8,990,948 | B2 | 3/2015 | Kumar et al. | |
| 9,282,114 | B1* | 3/2016 | Dotan | G06F 21/552 |
| 9,313,217 | B2 | 4/2016 | Arcamone et al. | |
| 9,356,944 | B1 | 5/2016 | Aziz | |
| 9,697,268 | B1* | 7/2017 | Prater | G06F 16/27 |
| 9,813,443 | B1* | 11/2017 | Subramanian | H04L 63/145 |
| 10,298,680 | B1* | 5/2019 | Thomas | H04L 43/0817 |
| 2003/0110393 | A1* | 6/2003 | Brock | G06F 21/554 726/23 |
| 2005/0240781 | A1* | 10/2005 | Gassoway | G06F 21/552 713/188 |
| 2005/0273856 | A1* | 12/2005 | Huddleston | G06F 21/53 726/22 |
| 2007/0118906 | A1* | 5/2007 | Mustafa | G06F 21/554 726/23 |
| 2007/0143843 | A1* | 6/2007 | Nason | G06F 21/568 726/22 |
| 2007/0150957 | A1* | 6/2007 | Hartrell | G06F 21/552 726/24 |
| 2007/0192863 | A1* | 8/2007 | Kapoor | G06F 9/505 726/23 |
| 2007/0283192 | A1* | 12/2007 | Shevchenko | G06F 21/554 714/39 |
| 2009/0293122 | A1* | 11/2009 | Abdel-Aziz | H04L 63/1416 726/23 |
| 2011/0173699 | A1* | 7/2011 | Figlin | H04L 63/1408 726/23 |
| 2011/0247071 | A1* | 10/2011 | Hooks | G06F 21/567 726/24 |
| 2012/0102570 | A1* | 4/2012 | Herz | G06Q 20/201 726/25 |
| 2013/0036214 | A1* | 2/2013 | Carmel | G06F 11/3006 709/223 |
| 2013/0097706 | A1 | 4/2013 | Titonis et al. | |
| 2014/0033310 | A1* | 1/2014 | Cheng | H04L 63/1416 726/23 |
| 2014/0090056 | A1* | 3/2014 | Manadhata | G06F 21/552 726/23 |
| 2014/0310811 | A1* | 10/2014 | Hentunen | H04L 63/1441 726/23 |
| 2014/0344926 | A1* | 11/2014 | Cunningham | H04L 63/1441 726/22 |
| 2014/0365825 | A1* | 12/2014 | Hooks | G06F 11/0748 714/20 |
| 2014/0372602 | A1* | 12/2014 | Fu | G06F 11/3452 709/224 |
| 2015/0013007 | A1* | 1/2015 | Hartrell | G06F 21/552 726/23 |
| 2015/0101010 | A1* | 4/2015 | Hartrell | G06F 21/552 726/1 |
| 2015/0121522 | A1* | 4/2015 | Guido | H04L 63/145 726/23 |
| 2015/0178496 | A1* | 6/2015 | Kohlenberg | G06F 21/316 726/23 |
| 2016/0099951 | A1* | 4/2016 | Kashyap | H04L 63/145 726/23 |
| 2016/0156658 | A1* | 6/2016 | Thomas | G06F 21/55 726/24 |
| 2016/0226892 | A1* | 8/2016 | Sen | H04W 12/02 |
| 2016/0321455 | A1* | 11/2016 | Deng | G06F 21/577 |
| 2017/0302688 | A1* | 10/2017 | Espes | H04L 63/14 |
| 2018/0034835 | A1* | 2/2018 | Iwanir | H04L 63/1416 |
| 2018/0255077 | A1* | 9/2018 | Paine | H04L 63/1425 |

OTHER PUBLICATIONS

Vasudevan, Amit. "MalTRAK: Tracking and eliminating unknown malware." 2008 Annual Computer Security Applications Conference (ACSAC). IEEE, 2008. (Year: 2008).*

Watson, Michael R., et al. "Malware detection in cloud computing infrastructures." IEEE Transactions on Dependable and Secure Computing 13.2 (2015): 192-205. (Year: 2015).*

Gu, Guofei, et al. "BotHunter: Detecting Malware Infection Through IDS-Driven Dialog Correlation." Usenix Security. vol. 7. 2007.

Moskovitch, Robert, Yuval Elovici, and Lior Rokach. "Detection of unknown computer worms based on behavioral classification of the host." Computational Statistics & Data Analysis 52.9 (2008): 4544-4566.

* cited by examiner

MALWARE ANALYSIS AND RECOVERY

PRIORITY CLAIM

This application claims priority to U.S. Provisional Patent Application No. 62/432,929, filed Dec. 12, 2016, titled "Near Realtime Malware Impact Analysis and Recovery," which is herein incorporated by reference.

STATEMENT REGARDING FEDERALLY SPONSORED RESEARCH AND DEVELOPMENT

This invention was made with United States government support under Contract No. DE-AC05-00OR22725 awarded by the United States Department of Energy. The United States government has certain rights in the inventions.

BACKGROUND

Technical Field

This disclosure relates to forensic analysis and more specifically to identifying software, which causes malicious operations.

Related Art

Malware is a threat. It exists in complex and obfuscated variants that mutates and eludes known detection systems. Some systems attempt to identify malware by identifying its signatures. These systems suffer because they detect only known viruses when the systems are loaded onto an end user's computer. The systems do not detect adaptive instances of malware and do not respond to new malicious threats.

DESCRIPTION OF THE DRAWINGS

The patent or application file contains at least one drawing executed in color. The Office upon request and payment of the necessary fee will provide copies of this patent or publication with color drawing(s).

DETAILED DESCRIPTION

An automated malware impact system (and process) provides new virus protection. It eliminates the need for manual inspections and speeds up malware identification as it detects malware on networks, servers, and end-user computers. By identifying both variant and invariant forms of malware through its turnkey system and process (referred to as a system), the system responds quickly and efficiently to variant and invariant malware forms.

Figure 1:
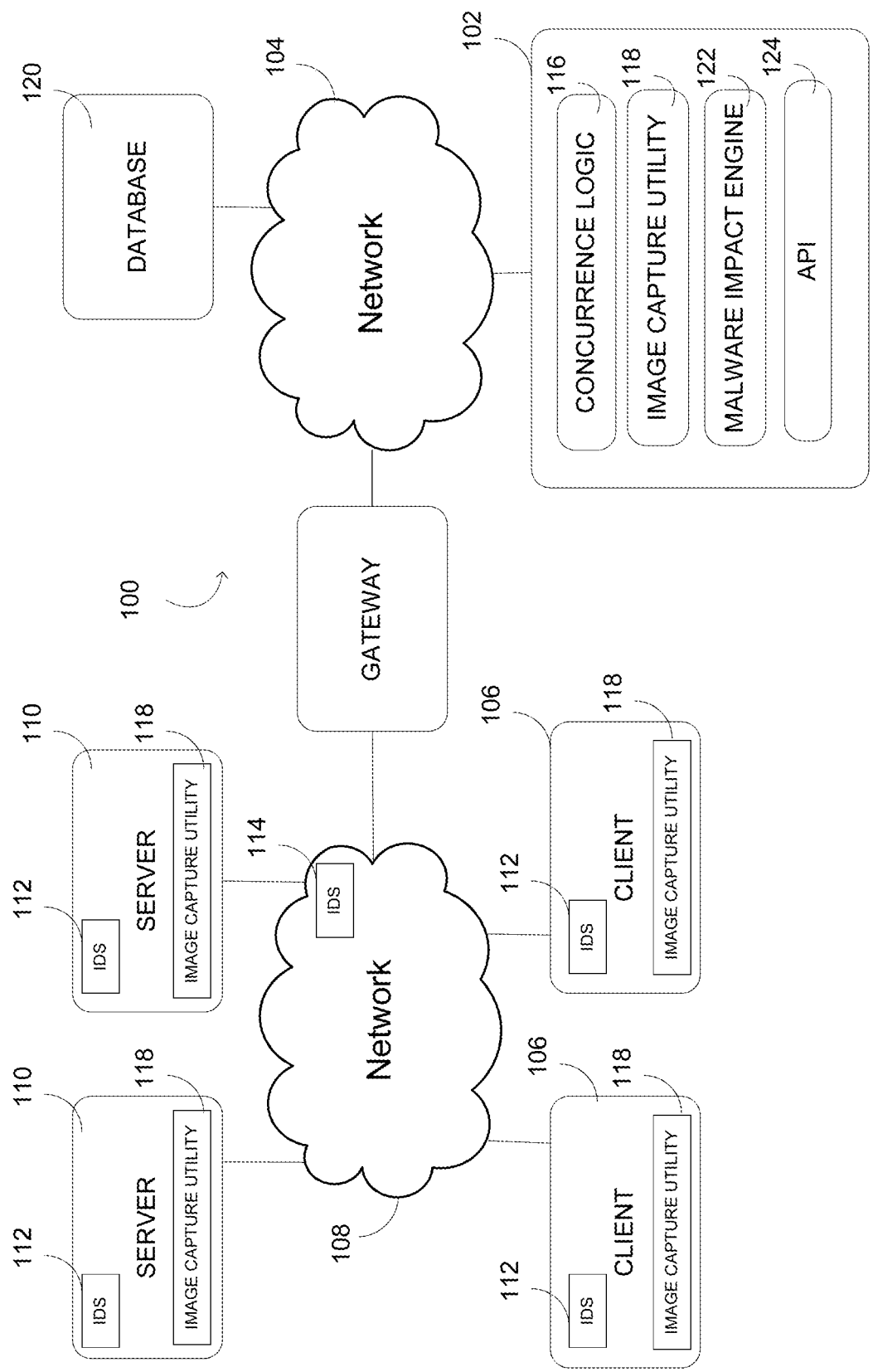
FIG. 1 is a block diagram of a malware impact system interfacing a network.

Malware impact systems 100 (and processes, hereinafter referred to as the malware impact system(s) or system(s)) of FIG. 1 analyze targeted computer systems to detect, and in some instances, removes or assists in the removal of malware. Instead of conducting analysis on a single end-user computer and/or an origin server, exclusively, the malware impact systems 100 detect malware via a separate intermediate server 102 or computer cluster and network 104 (between clients and origin servers) as shown in FIG. 1 allowing the malware analysis to serve remote clients 106, networks 108, and origin servers 110 concurrently. The malware analysis allows the malware impact systems 100 to detect new viruses and identify files and software that are designed to cause damage, rather than identifying only known viruses when the systems are activated. The malware impact systems 100 detect unknown viruses by identifying changes, and in some instances extracting suspicious code or data from an executable operating system, a memory, and/or downloadable application program.

The malware impact systems interface one or more Intrusion Detection Systems (IDS) 112 and/or 114 that monitor computer systems to identify attempts or activities that violate security policies of a computer system or network. Behind the computer system's access controls and its authentication processes, the IDS 112 and/or 114 identify suspected attacks, allowing the IDS 112 and/or 114 to detect potential attacks and propagate alert requests across a distributed network to a malware impact system 100. The malware impact system 100 constructs an image of the attack, verifies the attack, and in some instances, recovers or assists in the recovery from the attack.

An IDS may be remote 112, distributed (not shown), and/or network based 114. Remote based IDS 112 detect attacks against one or more host servers and/or clients, distributed IDS detect attacks across multiple hosts and/or clients, and network based IDS 114 detect attacks by monitoring network traffic removing the computational burden from the origin servers and clients. In a remote IDS 112, distributed IDS, and/or network based 114 IDS, a device may detect and notify the malware impact system 100 of a suspected intrusion with data (e.g., information indicative of the attack and its priority) and indicators indicating the strength of the possible detection. If the one or more devices suspect an attack with weak or inconclusive data and/or indicators, the one or more devices may request an impact analysis by making one or more alert requests to the malware impact system 100 and transmitting its state information and its priority. The suspected devices may also have other devices remote to the suspected devices transmit their state information too, some or all of the transmitted state information may include confidence values of the suspected states that are transmitted to the malware impact system. A remote device comprises a device or a group of devices that are located or dispersed in a relatively limited area of (or geographically close to) the suspected device and coupled to the attacking source by a communication link.

An optional concurrence system 116 in the malware impact systems 100 may determine a consensus alert state when the alert is in question based on the status of nearby or other remote devices. In some concurrence systems 116, the target device and the nearby or remote device status are assigned a greater weight than remote devices in evaluating a suspected intrusion alert request. A majority or an aggregated weighted confidence level exceeding a predetermined threshold may determine the alert status of the device (the servers and/or clients) that results in the malware impact systems executing an impact analysis. A server generally refers to one or more computers or devices that provide a resource or service to a client and a client refers to a requester of the resources or services.

In FIG. 1, the malware impact system 100 transmits an image capture utility 118 to the clients 106 and/or servers 110. When the image capture utility 118 is resident to the clients 106 and/or servers 110, it is referred to as the remote image capture utility 118 in this description. The remote image capture utility 118 captures non-volatile data, volatile data, and applications resident to the systems and operating systems (OS). The remote image capture utility 118 generates images of the entire system state including the system's executable code, its kernel, and its Basic Input Output System (BIOS). A hierarchical database 120 accessible to the malware impact systems 100 stores the information that registers the clients 106 and/or servers 110 when the clients 106 and/or servers 110 comes on line. The registry may contain information, such as profiles of the clients 106 and/or servers 110, the applications installed, and the contents of the clients 106 and/or servers 110 imaged and the time of those images. Once the remote image capture utility 118 registers with the malware impact system 100, the remote image capture utility 118 captures the baseline state of the system at a particular point in time via a snapshot. The snapshot is stored with the time and date of its capture as a baseline. The snapshot may occur in response to a request from a malware impact engine 122 or updated via a schedule at preconfigured time intervals. The remote image capture utility 118 may capture baseline images at synchronous and/or asynchronous intervals too. The remote image capture utility 118 may update the baseline image periodically every day, while the same or another remote image capture utility 118 may update baseline images every thirty minutes, for example. In some applications, the remote image capture utility 118 may take an image in response to an asynchronous event without suspending the operation of the server and/or client or requiring the server and/or client to reboot.

The remote image capture utility 118 creates an image of many data types, classes, and software. The classes may include: running processes, process hierarchies, code libraries, kernel modules (e.g., the operating and file system and its mounted file systems and devices), user logs, network data, memory, files, registry, browser history, threads, files, ports, drivers, executed commands, memory dumps, system logs, system calls, credentials, terminal sessions, network configuration, operating systems, mounted file systems, etc.

Running processes include data associated with software processes including identification (ID) numbers, time started, time ended, time running, a number of threads, a user identifier associated with it, processor consumption, and memory consumption. Networking data captured may include data indicating the number of open ports, the number of inbound and outbound packets and data, the number of IP addresses communicating with other computers, how long connections are open, processes associated with connections, and user identifications associated with connections. Recently captured run commands may include executed commands, the times and dates the commands were executed, runtimes, permissions associated with the commands, etc.

The portions of memory captured by the remote image capture utility 118 include the readable, writeable, and executable portions of memory and memory dumped from running processes. The memory captured may show if malware has changed the memory's permissions or if the malware injected itself into memory. Other data captured by the remote image capture utility 118 includes the computer files, threads, ports, registry entries, browser history, drivers, system logs (e.g., on Windows and Linux), system call runs, processed credentials, user authentication or privileges, escalation attempts, open terminal sessions, lists of remote users, network configurations, etc.

By not processing malware analysis on an origin server 110 and/or an end-user computer or client 106 exclusively, the malware impact system 100 processes data from many remote clients 106 and servers 110. By executing the analysis on a separate intermediate network 104, the malware impact systems 100 serve not only the computers and processes that request services and resources but also the computers and programs that respond to requests to provide services and resources. Further, the separation allows the malware impact system 100 to maintain clear boundaries with the remote clients 106 and servers 100 it may monitor, it improves security by providing greater control of the systems that request access, and it improves performance as it reduces congestion on the networks that service the remote clients 106 and servers 100 it monitors.

Figure 2:
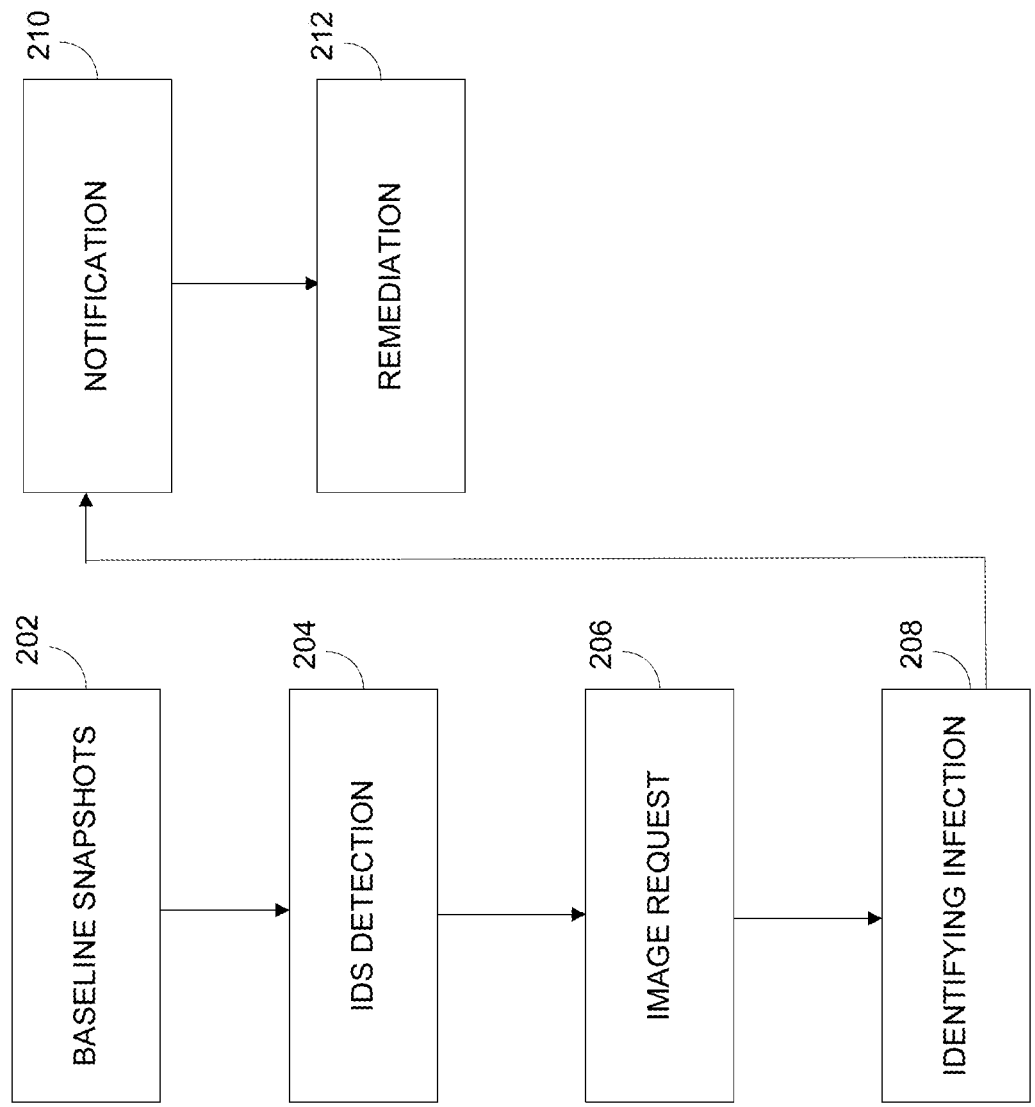
FIG. 2 is a process flow for detecting malware.

When a malware impact system receives a baseline image as shown at 202 in FIG. 2, it encrypts the image. The malware impact system 100 stores the images as a scalable object in the hierarchical database 120. The images are accessed through a malware impact engine Application Program Interface 124 (API) that tracks baseline images, status images, and connections to the clients 106 and the servers 110.

When a malware attack occurs, one or more remote 112, distributed, and/or network based 114 IDS transmit an alert request at 204 to the malware impact engine API 124. Each alert request contains a confidence level and a priority. When a confidence level establishes the likelihood of an infection, the malware impact engine 122 parses the alert request, cancel scheduled transfers to the suspected device, and schedules a snapshot of the suspected device through the remote image capture utility 118 on the suspected machine. As other alert requests are received, those requests are served in the order of their priority.

When a request for a subsequent image is received from the malware impact engine 122, the remote image capture utility 118 on the suspected device captures classes of data and links it to a baseline image. The classes of data that are captured are the same data captured when the remote image capture utility 118 established a baseline image for that device. In some systems, the images are linked via an attachment or a pointer. The malware impact system 100 receives the image while it continues collect baseline images and alert requests from other clients 106 and servers 110. The malware impact system 100 responds to the changing traffic loads through load balancing.

When an image from a potentially infected device is received, a data comparison tool calculates and displays the differences between that image and the most recent baseline image at 208. The comparison tool identifies the changes made in data structure by rendering a display that a manual and/or an automated system processes to identify the differences. A diff utility or a diffing process may execute the comparisons. The utility and processes may run independently from the image collections and request servicing.

While the malware impact system 100 calculates and displays the differences between the images, the malware impact system 100 assigns the suspected device a POST status, which causes the remote image capture utility 118 to take post-infected images of the infected device over time. By comparing post-infected images to other images, the malware impact system 100 may identify a series of traits that differentiate malicious files, device state, and code from benign files, device state, and code. This allows the malware impact system 100 to learn which files are malicious and which are benign based on databases of both malicious and benign code during its operation.

When differences between an image and a baseline image are detected, an optional push notification is transmitted to an analyst and/or a fully automated malware recovery system at 210. The differences may be rendered by a dashboard or transmitted to the fully automated malware recovery system at 210 through one or more data structures that identify the portions of the infected systems. The dashboard or data structure may identify how the systems and processes changed, it may show changes in registry entries and addresses, it may show new and closed network connections, it may show the amount of data being transmitting, and it may show any other changes that were detected.

In response, an optional malware recovery system may initiate remediation at 212. The remediation may or may not shut down the affected device, revert the suspected device to an earlier baseline image without wiping the infected device, ignore the alert request because the differences between the images is deemed not harmful, etc. In some systems, the malware recovery system makes use of machine learning and/or heuristics that identify malicious code, device state, and files from benign code, device state, and files by making decisions based on a series of traits associated with malware that it learns during its operations. Some traits may indicate a higher probability of infection than other traits. Since malware evolves rapidly, the machine learning and/or heuristics also evolve rapidly based on the evolving hierarchy of traits identified by the malware impact system's 100 analysis.

Figure 3:
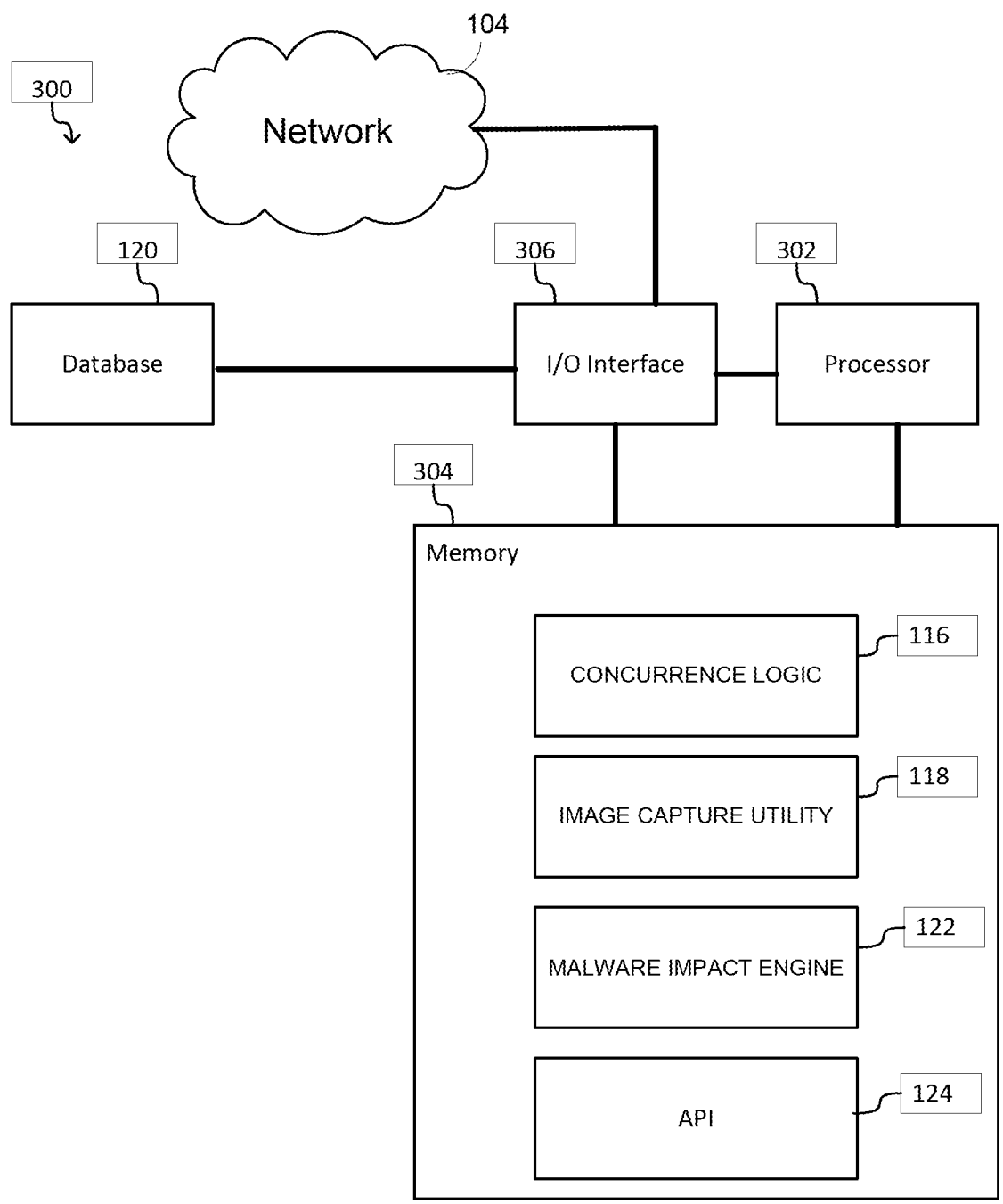
FIG. 3 is a block diagram of an alternative malware impact system interfacing a network.

FIG. 3 is an alternate block diagram of the automated malware impact system 300. The system comprises a processor 302, a non-transitory media such as a memory 304 (the contents of which are accessible by the processor 302), a database 120, and an I/O interface 306. The I/O interface 306 communicates with local devices (e.g., nodes) and/or remote applications and other networks, for example, which may include remote clients 106 and servers 110. The memory 304 may store instructions which when executed by the processor 302 causes the system to render some or all of the functionality associated with the automated malware impact scheme. For example, the memory 304 may store instructions which when executed by the processor 302 causes the system to render the functionality associated with the optional concurrence logic 116, remote image capture utility 118, the malware impact engine 122, and the API.

The processors 302 may comprise a single processor or multiple processors that may be disposed on a single chip, on multiple devices, or distributed over more than one system. The processors 302 may be hardware that executes computer executable instructions or computer code embodied in the memory 304 or in other memory to perform one or more features of the systems described herein. The processor 302 may include a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 304 and/or storage disclosed may retain an ordered listing of executable instructions for implementing the functions described above. The machine-readable medium may selectively be, but not limited to, an electronic, a magnetic, an optical, an electromagnetic, an infrared, non-transient medium, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), an Oblivious Random Access Memory (ORAM), or a database management system. The memory 304 may comprise a single device or multiple devices that may be disposed on one or more dedicated memory devices or on a processor or other similar device. The memory 304 may also store a non-transitory computer code, executable by processor 302. The computer code may be written in any computer language, such as C, C++, assembly language, channel program code, ladder logic, and/or any combination of computer languages.

The functions, acts or tasks illustrated in the figures or described may be executed in response to one or more sets of logic or instructions stored in or on non-transitory computer readable media as well. The functions, acts or tasks are independent of the particular type of instructions set, storage media, processor or processing strategy and may be performed by software, hardware, integrated circuits, firmware, micro code and the like, operating alone or in combination. In one embodiment, the logic or instructions are stored in a remote location for transfer through a computer network or over wireless or tangible telephone or communication lines.

The term "coupled" disclosed in this description may encompass both direct and indirect coupling. Thus, first and second circuits are said to be coupled together when they directly communicate with one another, as well as when the first circuit communicates with an intermediate circuit which couples either directly or via one or more additional intermediate circuits communicate to the second circuit. The term "substantially" or "about" may encompass a range that is largely, but not necessarily wholly, that which is specified. It encompasses all but a significant amount, such as a variance within five or ten percent. When devices are responsive to commands events, and/or requests, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action (i.e., the device's response to) merely follow another action.

The automated malware impact systems and processes provides new virus protection. The systems and methods eliminates the need for manual inspections and speeds up malware identification as it detects malware on networks, servers, and end-user computers. By identifying both variant and invariant forms of malware through its turnkey system and process, the systems and methods respond quickly and efficiently to variant and invariant malware forms.

While various embodiments of the invention have been described, it will be apparent to those of ordinary skill in the art that many more embodiments and implementations are possible within the scope of the inventions. Accordingly, the inventions are not to be restricted except in light of the attached claims and their equivalents.

What is claimed is:
1. A method comprising:
receiving baseline snapshots of a client and/or a server from an image capture utility remote from a malware system;
storing the baseline snapshots in the malware system remote from the client and/or the server and remote from the image capture utility;
receiving from the client and/or the server a notification of a suspected malware intrusion on the client and/or the server;
constructing an image of the suspected malware intrusion at the client and/or the server;
linking by a pointer and the image capture utility the image of the suspected malware intrusion to the base- line snapshots stored in the malware system at the client before the malware intrusion is confirmed;

generating a consensus alert state of the client and/or the server consisting of statuses of a plurality of devices that are remote from the malware system;

propagating the image of the suspected malware intrusion across a first network and a second network; and processing the suspected malware intrusion distinguishing malicious code, device state, and files from benign code, device state, and files;

where the notification comprises data indicating a confidence level of the suspected malware intrusion and its priority, where the priority and consensus alert state determines when the suspected malware intrusion is processed.

2. The method of claim 1 wherein the receiving baseline snapshots of the client and/or the server occurs in response to an asynchronous event.

3. The method of claim 1 wherein receiving baseline snapshots of the client and/or the server occurs in response to a synchronous schedule.

4. The method of claim 1 wherein the notification of the suspected malware intrusion is generated by a remote intrusion detection system.

5. The method of claim 1 wherein the notification of the suspected malware intrusion is generated by a distributed intrusion detection system.

6. The method of claim 1 wherein the notification of the suspected malware intrusion is generated by a network intrusion detection system that detects the suspected malware intrusion by monitoring only network traffic.

7. The method of claim 1 further comprising evaluating the notification of the suspected malware intrusion based on state information from other clients and/or other servers.

8. A non-transitory machine-readable medium encoded with machine-executable instructions, wherein execution of the machine-executable instructions is for:

receiving baseline snapshots of a client and/or a server from an image capture utility remote from a malware system;

receiving from the client and/or the server a notification of a suspected malware intrusion on the client and/or the server;

constructing an image of the suspected malware intrusion at the client and/or the server;

linking by a pointer and the remote image capture utility the image of the suspected malware intrusion to the baseline snapshots stored in the malware system at the client before the malware intrusion is confirmed;

generating a consensus alert state of the client and/or the server consisting of statuses of a plurality of devices that are remote from the malware system;

propagating the image of the suspected malware intrusion across a first network and a second network; and processing the suspected malware intrusion including distinguishing malicious code and files from benign code and files;

where the notification comprises data indicating a confidence level of the suspected malware intrusion and its priority, where the priority and consensus alert state determines when the suspected malware intrusion is processed on the second network.

9. The non-transitory machine-readable medium of claim 8 wherein receiving baseline snapshots of the client and/or the server occurs in response to an asynchronous event.

10. The non-transitory machine readable medium of claim 8 wherein receiving baseline snapshots of the client and/or the server occurs in response to a synchronous schedule.

11. The non-transitory machine-readable medium of claim 8 wherein the notification of the suspected malware intrusion is generated by a remote intrusion detection system.

12. The non-transitory machine-readable medium of claim 8 wherein the notification of the suspected malware intrusion is generated by a distributed intrusion detection system.

13. The non-transitory machine-readable medium of claim 8 wherein the notification of the suspected malware intrusion is generated by a network intrusion detection system that detects the suspected malware intrusion by monitoring only network traffic.

14. The non-transitory machine-readable medium of claim 8 further comprising evaluating the notification of the suspected malware intrusion on the client and/or the server based on state information from other clients and/or servers.

15. A system comprising:

an application program interface of a malware system configured to receive baseline snapshots of a client and/or a server remote from the malware system;

an intrusion detection system configured to transmit a notification of a suspected malware intrusion on the client and/or the server;

a remote image capture utility stored in a memory of the client and/or server configured to construct an image of the suspected malware intrusion at the client and/or the server when executed by a processor; and a malware impact engine configured to receive the image of the suspected malware attack from a first network and a second network;

an occurrence system configured to generate a consensus alert state of the client and/or server consisting of statuses of a plurality of devices that are remote from the malware system;

where the malware impact engine is configured to process the suspected malware intrusion including distinguishing malicious code and files from benign code and files; and where the remote image capture utility is further configured to link via a pointer the image of the suspected malware intrusion to the baseline snapshots of the client on the client; and where the notification comprises data indicating a confidence level of the suspected malware intrusion and its priority, where the priority and consensus alert state determines when the suspected malware intrusion is processed on the second network.

16. The system of claim 15 wherein the notification of the suspected malware intrusion is generated by a network intrusion detection system that detects the suspected malware intrusion by monitoring only network traffic.

17. The system of claim 15 further comprising a malware recovery system that executes machine learning, a heuristic and includes a malware recovery system that reverts the client and/or the server to the baseline snapshots.

* * * * *